United States Patent [19]
Ylitalo

[11] Patent Number: 5,149,269
[45] Date of Patent: Sep. 22, 1992

[54] MANUAL TEACHING CALCULATOR

[76] Inventor: Howard Ylitalo, R.R. 2, Box 106, Cokato, Minn. 55321

[21] Appl. No.: 702,404

[22] Filed: May 20, 1991

[51] Int. Cl.$^5$ ................................................ G06C 1/00
[52] U.S. Cl. ..................................... 434/203; 434/207
[58] Field of Search ............... 434/203, 206, 207, 205, 434/200

[56] References Cited

U.S. PATENT DOCUMENTS

| | | | |
|---|---|---|---|
| 465,811 | 12/1891 | Anderson | 434/203 |
| 541,787 | 6/1895 | Hegewald et al. | 434/203 X |
| 1,099,009 | 6/1914 | Bennett | 434/203 |
| 3,092,917 | 6/1963 | Podell | 434/203 |
| 4,812,124 | 3/1989 | Colodner et al. | 434/203 |

FOREIGN PATENT DOCUMENTS 0813081 7/1951 Fed. Rep. of Germany ...... 434/203

Primary Examiner—John J. Wilson
Assistant Examiner—Jeffrey A. Smith
Attorney, Agent, or Firm—Leo Gregory

[57] ABSTRACT

An arithmetic teaching device consisting of a rod having hand movable spaced collars slidable thereon and having sequentially spaced numbers therealong corresponding to the collars whereby the numbers indicate visually the arithmetic calculation of preceeding manipulated numbers.

1 Claim, 2 Drawing Sheets

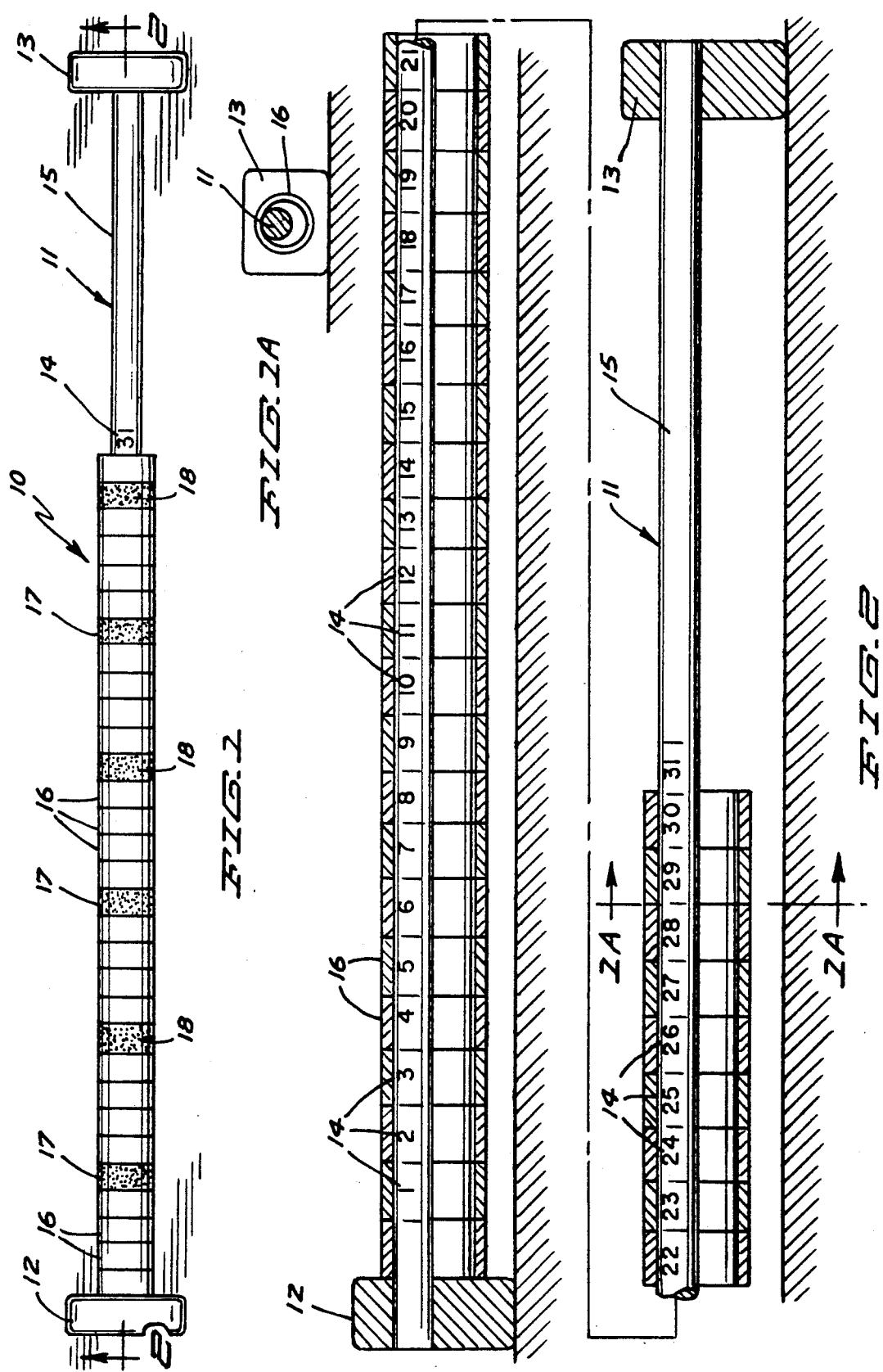

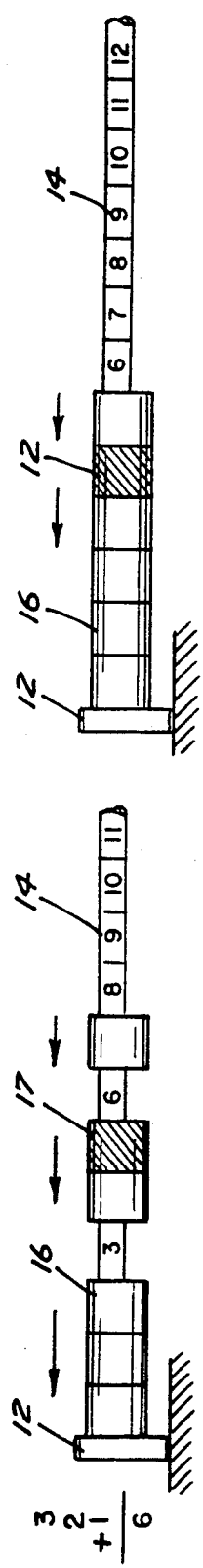
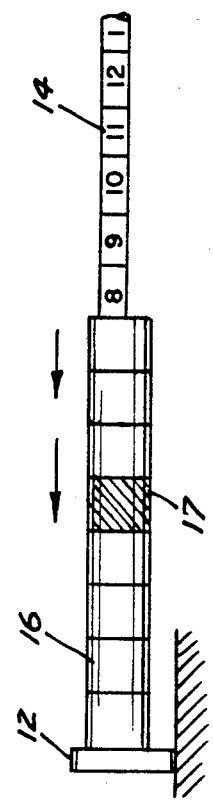
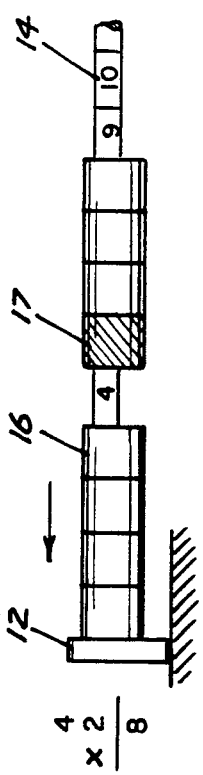
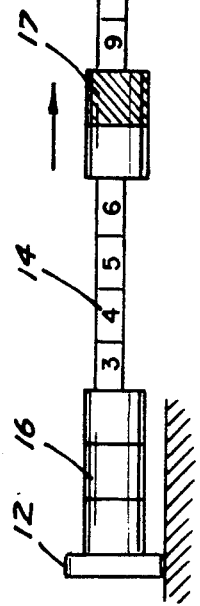
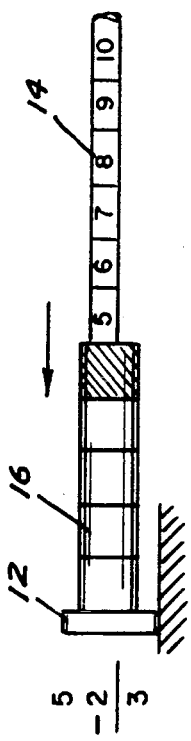
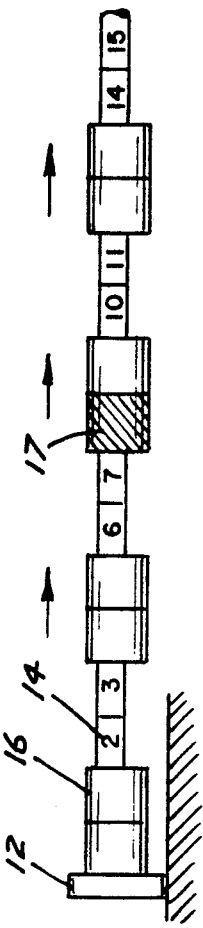
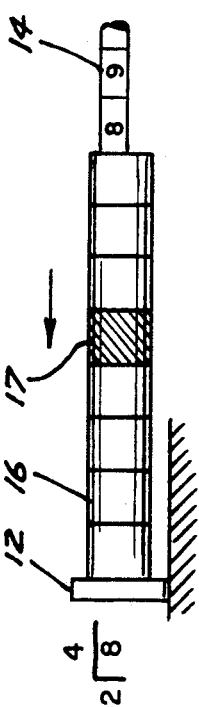

MANUAL TEACHING CALCULATOR

BACKGROUND OF THE INVENTION

1. Field of Invention

The invention relates to a manually operated calculating device.

2. Brief Description Of Previous Art

An early development of a manually operable calculating device is the abacus which comprises a plurality of transversely spaced vertically disposed strings having movable counters thereon but there is no resulting numerical reading of a calculation.

In teaching simple or elementary arithmetic functions to beginning school graders, it is very helpful to the learning process to reduce mental calculations or the combination of visual and mental calculations, such as a teacher illustrating on a blackboard, to a hands-on situation in which the pupil or school grader applies his hands physically in carrying out the calculations demonstrated by the teacher. Where the pupil can physically carry out the calculating function and observe or see what he is doing, the mental process of absorbing and understanding the calculation process and its result is greatly expedited. This has been attested to by teachers involved in teaching arithmetic to beginning learners.

SUMMARY OF THE INVENTION

This invention relates to an arithmetic teaching device for children learning simple arithmetic functions or calculations wherein a hands-on approach supplements and combines with the visual and mental processes of explanation and illustration on a blackboard to expedite the learning process.

The invention comprises a rod having individual collars thereon of a sufficient number to accommodate simple arithmetic functions with corresponding numerals in sequence.

By way of example, each fifth collar is colored to readily display groups of five collars, now for subtraction, let us assume there are ten collars at the left hand end of the rod with the numeral 10 visible just to the right of the tenth collar. The student is requested to subtract five. Hence he moves five collars to the right and uncovers the numeral five with the movement of the fifth collar. Thus his answer is visible, 10−5=5 and he physically hands-on performed the calculations and it registered mentally. The reverse would result in addition and the numeral 10 would be displayed at the right of the tenth collar.

For an example of multiplication, with all collars to the right end portion of the rod, move four collars to the left end of the rod, then to multiply by two, move another set of four collars to the left and the numeral exposed at the right of the rightmost collar will be eight which is the product accomplished physically, mentally and visually.

For division, with the collars to the right end portion of the rod, now, for the example, slide eight collars to the left end of the rod as the dividend, with the divisor of two, separate the dividend into groups of two collars and there are four groups of collars which is the quotient. So it is clear that the young learner is exercising his faculties of hands-on or physical application responsive to his mental and visual separation of the dividend into groups of two collars each and resulting in four groups of collars, the quotient.

This process very remarkably supplements the visual operation of a blackboard demonstration with the mental comprehension of it. Thus the whole learning process is expedited.

The above opinion has been fortified by those of several accredited teachers who are engaged in teaching the age group to which reference is had herein.

Thus it is the desire to provide a very simply operated learning device for simple arithmetic functions to very effectively expedite the otherwise traditional learning process of just sight and hearing.

BRIEF DESCRIPTION OF THE DRAWINGS

FIG. 1 is a general view in front elevation;

FIG. 1A is a detail showing relative size of the parts indicated taken on line 1A—A of FIG. 2;

FIG. 2 is a view in longitudinal vertical section in two parts of the invention;

FIGS. 3-10 are segmental portions in front elevation showing various arrangements of specific portions thereof which relate to the description thereof given in the specification.

DESCRIPTION OF A PREFERRED EMBODIMENT

Referring to the drawings and more particularly to FIG. 1, the arithmetic teaching device comprising the invention herein is indicated generally by the reference numeral 10.

Said device as illustrated here is made up of a rod member 11 which for purpose of description herein is shown to be in the order of twenty one inches in length and one half inch in diameter having stop-support members 12 and 13 at the ends thereof suitably secured thereto as by being recessed to receive end portions of the rod and have the same secured by recessed screws not here shown.

Spaced along said rod and facing forwardly thereof are the numerals 14 spaced apart and by way of example are shown to be from 1 through 31. An unnumbered space 15 along the rod is left to the right of the numbered extent for a purpose as will be indicated hereinafter.

Mounted on said rod are collars 16 corresponding in number to the numerals on said rod. For ease of purpose as will be further described, the alternate fifth of each of said collars is a different color to readily indicate groups of five collars each as at 17 being indicated as blue and at 18 as being red.

The collars as here shown are made of a fairly rigid plastic material having an outer diameter on the order of 15/16 inches and an inner diameter on the order of ⅝ inches for easy sliding movement along said rod.

It will be understood that the dimensions recited are relative and the collars as here indicated are of a size readily manipulated for sliding along the rod. The relative size of the parts are merely a matter of convenience for purpose of use. The collars may be rings of narrow width. Exposed at the right of each collar is a corresponding numeral when the collars are positioned as viewed in the drawings.

The unnumbered length of the rod at the right end portion thereof is for the purpose of merely placing collars not being then used for calculation purposes. With each ring in its relative position, it will be noted that its corresponding numeral will appear immediately to its right.

The rod and its end members although here indicated as being made of wood, may be formed of a suitable plastic material or other suitable material or materials may be used.

The numerals are shown to be individual as spaced but may be directly imprinted by being embossed or impressed or may be applied to a strip secured to the rod.

The invention herein lies not in the specific construction as shown but in the working inter-relationship of the collars or their equivalents as manipulated on the rod with reference to the corresponding spaced numerals on the rod.

A description of the operation will now be given.

Some simple calculations were described in the Summary hereof and similar examples follow.

First of all, all of the collars are moved to the left of rod 14.

To illustrate steps in addition, refer to FIGS. 3 and 4. Our first computation is to add three, two and one. First, move the three collars at the left to the left end portion of rod 14. If moving three collars to the left does not register mentally a number, then the operator will be told to watch the numbers as the collars are moved and when the third collar is moved, the numeral three will be seen at the right of the third collar. Then a next group of two collars are moved to the left followed by the movement of a single collar. Then the operator will be told to note the numeral at the right of the last collar moved and the numeral 6 will be seen which is the answer. This is obvious to the reader but it must be borne in mind that the operator is a small child having had no formal previous experience in counting and in working out the calculation indicated.

For multiplication, refer to FIGS. 5 and 6. All of the collars will be moved to the right hand portion of rod 14. The problem is to multiply four times two. Hence the child operator moves to the left end portion of said rod, the first group of four collars or one at a time until the numeral 4 appears in the rod at the right of the last collar moved. Then the next four collars are moved to the left to abut the adjacent collars of the first group moved. That done, the operator sees the numeral eight at the right of the last collar moved and this is the product and the answers or product. Thus sets of four collars each moved twice or four times two equal eight. The elements of seeing and doing in registering with the operator mentally carry out the learning process resulting from the use of the invention herein.

Now for illustrating subtraction, refer to FIGS. 7 and 8. At the beginning of each example, the collars will be moved to the right on the rod 14. The problem here will be to take away two from five. It is understood of course that all of the steps indicated for purpose of calculation are carried out under varied and demonstrated direction of a knowing person such as an accredited teacher who may have an enlarged model of the invention for demonstration.

The child first counts one by one the first five collars to the left and moves them one by one to the left end of rod 14 or the child may move to the left the first colored collar at the left and five collars will be moved at one time. After having been thus moved, the operator will see the numeral 5 at the right of the colored collar. The child will then move two collars back to the right leaving three as indicated by the numeral 3 on rod 14 at the right of the right end collar remaining. Thus five less two equals 3.

The final calculating explanation is in division. Our example will be to get the quotient or answer of eight divided by four. Reference is had to FIGS. 9 and 10.

The child operator, given the problem, is instructed to move eight collars to the left. He can move the first group of five by moving the leftmost colored collar and then move additional collars until the numeral 8 is just to the right of the last collar moved. The teacher will next explain that four will go into eight just as many times as groups of four can be taken away from eight. The child operator is instructed to count out the right hand four collars of those just moved and move them to the right. Then the child operator will be instructed to move an additional four collars to the right. Thus with two sets of collars of four each having been moved to the right, nothing remains. Thus with two groups of four making eight, eight divided by four equals two. The number of separated groups make clear the answer. Thus the divisor is two.

Again it is emphasized that under instruction or on his own, the child operator has a hands-on approach in physically moving individual collars to make up groups of four each separated one from the other, he has the visual experience of the physical counting and the absorbtion of it mentally. Thus a significant impact is made on the learning process of the child operator.

Thus it is seen that there has been provided a simply constructed and very effective tool or device for teaching arithmetic calculations to a small beginning learner by employing the child's three significant senses, the physical, visual and mental senses which in acting together expedite the learning process.

It will of course be understood that various changes may be made in the form, details, arrangement and proportions of the product without departing from the scope of the invention, which, generally stated, consists in a device capable of carrying out the objects above set forth, such as disclosed and defined in the appended claims.

What is claimed is:

1. A manually operable arithmetic calculating device, having in combination,
 a single rod,
 a stop member at each end of said rod,
 said rod having thirty one rings thereon slidable therealong,
 said rings being colored with each fifth ring being of a different color to indicate groups of five rings,
 numerals on said rod corresponding in number to the number of said rings and respectively appearing to the right of each ring,
 an unnumbered length of said rod extending from the last number thereon to provide a space for unused rings, and
 said stop member being of a height to elevate said rod on a flat surface sufficiently to move said rings in making calculations.

* * * * *